US009267065B2

(12) United States Patent
Van Horn et al.

(10) Patent No.: US 9,267,065 B2
(45) Date of Patent: *Feb. 23, 2016

(54) AZEOTROPE AND AZEOTROPE-LIKE COMPOSITIONS OF 1-CHLORO-3,3,3-TRIFLUOROPROPENE AND HFC-245EB

(75) Inventors: Brett L. Van Horn, King of Prussia, PA (US); Philippe Bonnet, Lyons (FR); Laurent Abbas, Narberth, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/390,579

(22) PCT Filed: Aug. 11, 2010

(86) PCT No.: PCT/US2010/045104
§ 371 (c)(1),
(2), (4) Date: Feb. 15, 2012

(87) PCT Pub. No.: WO2011/022260
PCT Pub. Date: Feb. 24, 2011

(65) Prior Publication Data
US 2012/0138847 A1 Jun. 7, 2012

Related U.S. Application Data

(60) Provisional application No. 61/234,397, filed on Aug. 17, 2009.

(51) Int. Cl.
C09K 5/04 (2006.01)
C09K 3/30 (2006.01)
C08J 9/14 (2006.01)

(52) U.S. Cl.
CPC ............... C09K 5/045 (2013.01); C08J 9/144 (2013.01); C09K 3/30 (2013.01); C08J 2203/142 (2013.01); C08J 2203/162 (2013.01); C08J 2203/182 (2013.01); C09K 2205/122 (2013.01)

(58) Field of Classification Search
CPC ..... C09K 5/044; C09K 3/30; C09K 2205/122; C09K 2205/32
USPC .......................................................... 252/67
See application file for complete search history.

(56) References Cited

U.S. PATENT DOCUMENTS

| RE37,938 E | 12/2002 | Minor et al. |
| 7,217,373 B2 | 5/2007 | Minor |
| 8,703,690 B2 * | 4/2014 | Van Horn et al. ............. 510/408 |
| 2009/0041677 A1 | 2/2009 | Singh et al. |
| 2009/0242832 A1 | 10/2009 | Pham et al. |
| 2009/0256110 A1 | 10/2009 | Merkel et al. |
| 2009/0305876 A1 * | 12/2009 | Singh et al. ................... 502/150 |
| 2010/0016457 A1 | 1/2010 | Bowman et al. |
| 2010/0048961 A1 * | 2/2010 | Merkel et al. ................. 570/160 |
| 2010/0102273 A1 | 4/2010 | Basu et al. |

FOREIGN PATENT DOCUMENTS

| WO | WO 2009/067720 A2 | 5/2009 |
| WO | WO 2009/089511 A2 | 7/2009 |

* cited by examiner

Primary Examiner — John Hardee
(74) Attorney, Agent, or Firm — Steven D. Boyd

(57) ABSTRACT

The present invention relates to azeotrope and azeotrope-like compositions comprised of 1-chloro-3,3,3-trifluoropropene (HCFO-1233zd) and 1,1,1,2,3-pentafluoropropane (HFC-245eb), and uses thereof.

13 Claims, 1 Drawing Sheet

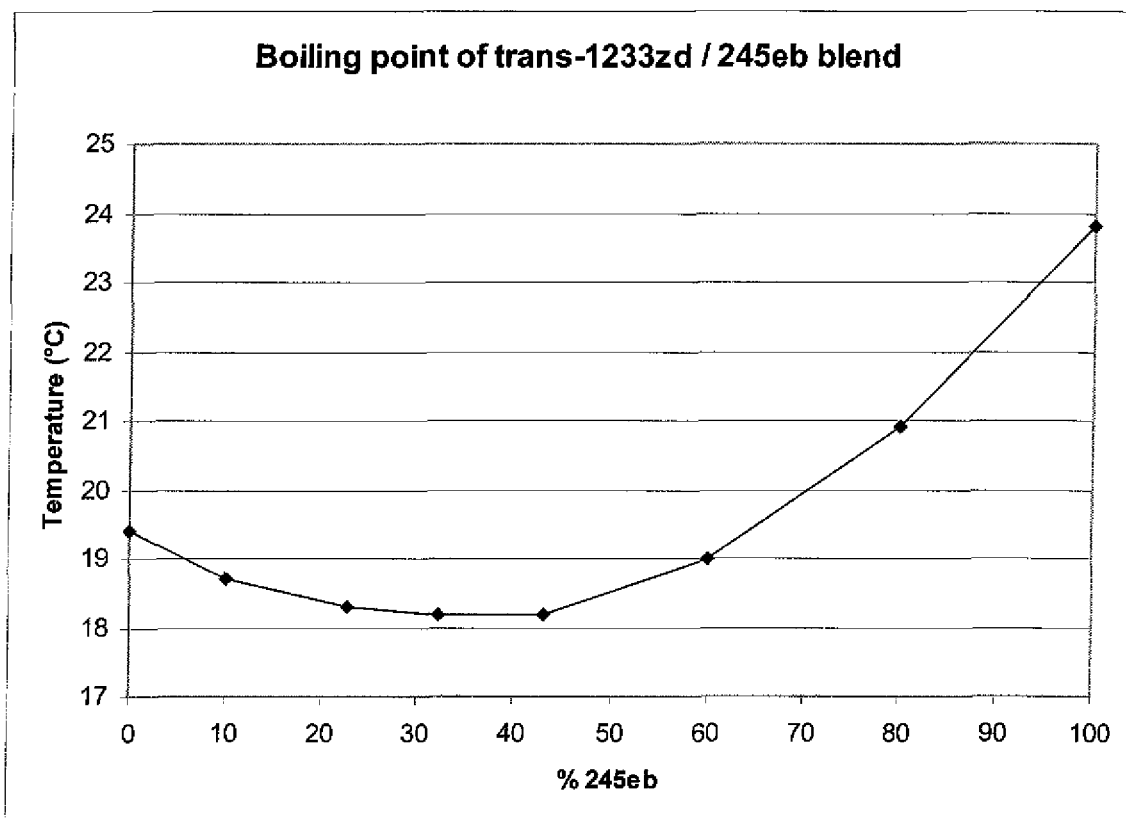

AZEOTROPE AND AZEOTROPE-LIKE COMPOSITIONS OF 1-CHLORO-3,3,3-TRIFLUOROPROPENE AND HFC-245EB

FIELD OF INVENTION

The present invention relates to azeotrope and azeotrope-like compositions comprised of 1-chloro-3,3,3-trifluoropropene (HCFO-1233zd) and 1,1,1,2,3-pentafluoropropane (HFC-245eb), and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The object of the present invention is to provide novel compositions that can serve as refrigerants, heat transfer fluids, blowing agents, solvents, de-fluxing agents, degreasers, aerosols, etc. that further provide a reduction in the global warming and/or ozone depletion potential of the HCFC and HFC alternatives.

BRIEF DESCRIPTION OF THE DRAWINGS

FIG. 1 is a graph of boiling point for various blends of trans-1233zd and 245eb.

DESCRIPTION OF PREFERRED EMBODIMENTS

The present inventors have developed several compositions that help to satisfy the continuing need for alternatives to CFCs and HCFCs. According to certain embodiments, the present invention provides azeotrope or azeotrope-like compositions comprised of 1-chloro-3,3,3-trifluoropropene (HCFO-1233zd) and 1,1,1,2,3-pentafluoropropane (HFC-245eb).

1-chloro-3,3,3-trifluoropropene exists in two stereoisomers: cis- and trans-. As used herein, 1-chloro-3,3,3-trifluoropropene (HCFO-1233zd) refers to cis-/trans-mixtures containing predominantly the trans-isomer to essentially the trans-isomer. As used herein, trans-HCFO-1233zd refers to about 99% to essentially the trans-isomer of HCFO-1233zd.

The preferred compositions of the invention tend both to be low- to non-flammable and to exhibit relatively low global warming potentials ("GWPs"). Accordingly, applicants have recognized that such compositions can be used to great advantage in a number of applications, including as replacements for CFCs, HCFCs, and HFCs (such as HCFC-141b, HCFC-123, HFC-245fa, HFC-365mfc etc.) in refrigerant, heat transfer, foam blowing, aerosol, and other applications.

Additionally, applicants have recognized surprisingly that azeotrope or azeotrope-like compositions of HCFO-1233zd with HFC-245eb can be formed. Accordingly, in other embodiments, the present invention provides methods of producing an azeotrope-like composition comprising combining HCFO-1233zd with HFC-2456 in amounts effective to produce an azeotrope-like composition.

In addition, applicants have recognized that the azeotrope-like compositions of the present invention exhibit properties that make them advantageous for use as, or in, refrigerant compositions, solvents, and in foam blowing agents. Accordingly, in yet other embodiments, the present invention provides refrigerant compositions and/or flowing blowing agents, and solvents comprising an azeotrope-like composition of HCFO-1233zd and HFC-245eb.

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during a phase change.

The azeotrope-like compositions of the present invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well recognized in the art that it is not possible to predict the formation of azeotropes. Applicants have discovered unexpectedly that HCFO-1233zd and HFC-245eb form an azeotrope or azeotrope like composition.

According to certain preferred embodiments, the azeotrope or azeotrope-like compositions of the present invention comprise, and preferably consist essentially of, effective azeotrope or azeotrope-like amounts of HCFO-1233zd and HFC-245eb. The term "effective azeotrope-like amounts" as used herein refers to the amount of each component that upon combination with the other components, results in the formation of an azeotrope-like composition of the present invention. Preferably, the present azeotrope-like compositions comprise, and preferably consist essentially of, from about 99.9 to about 1 weight (wt) percent HCFO-1233zd and from about 0.1 to about 99 wt percent of HFC-245eb. More preferably, the azeotrope-like compositions comprise from about 99.9 to 20 wt percent HCFO-1233zd and from about 0.1 to about 80 wt percent HFC-245eb. Even more preferably, the azeotrope-like compositions of the present invention comprise about 99.1 to about 40 wt percent HCFO-1233zd and from about 0.1 to about 60 wt percent HFC-245eb. Even more preferably, the azeotrope-like compositions of the present invention comprise about 90 to about 40 wt percent HCFO-1233zd and from about 10 to about 60 wt percent HFC-245eb. Even more preferably, the azeotrope-like compositions of the present invention comprise about 80 to about 55 wt percent HCFO-1233zd and from about 20 to about 45 wt percent HFC-245eb. And even more preferably, the azeotrope-like compositions of the present invention comprise about 77.3 to about 57 wt percent HCFO-1233zd and from about 22.7 to about 43 wt percent HFC-245eb. Unless otherwise indicated, the wt percents disclosed herein are based on the total wt of HCFO-1233zd and HFC-245eb in a composition.

Another embodiment of the present invention are azeotrope-like compositions with a boiling point between about 18° C. and about 24° C., preferably between about 18° C. and about 20° C., more preferably between about 18° C. and about 19.5° C., and even more preferably between about 18° C. and about 19° C. at a pressure of about 1.013 bar.

The azeotrope-like compositions of the present invention can be produced by combining effective azeotrope or azeotrope-like amounts of HCFO-1233zd and HFC-245eb. Any of a wide variety of methods known in the art for combining two or more components to form a composition can be adapted for use in the present methods to produce an azeotrope-like composition. For example, HCFO-1233zd and HFC-245eb can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The azeotrope or azeotrope-like compositions of the present invention may further include any of a variety of optional additives including stabilizers, metal passivators, corrosion inhibitors, and the like.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include WITCO® LP 250 (registered trademark of Witco Chemical Comp, ZEROL® 300 (registered trademark of Shrieve Chemical, Sunisco 3GS from Witco Chemical Comp, and Calumet R015 from Calumet. Commercially available alkyl benzene lubricants include ZEROL® 150. Commercially available esters include neopentyl glycol dipelargonate which is available as EMERY® 2917 (registered trademark of Cognis Corp) and HATCOL® 2370 (registered trademark of Hatcol Chemical Co.). Other useful esters include phosphate esters, dibasic acid esters, and fluoroesters. Preferred lubricants include polyalkylene glycols and esters. Certain more preferred lubricants include polyalkylene glycols.

Uses of the Compositions

The present compositions have utility in a wide range of applications. For example, one embodiment of the present invention relates to refrigerant compositions comprising the present azeotrope-like compositions.

The refrigerant compositions of the present invention may be used in any of a wide variety of refrigeration systems including air-conditioning, refrigeration, heat-pump, chiller, HVAC systems, and the like. In certain preferred embodiments, the compositions of the present invention are used in refrigeration systems originally designed for use with an HCFC refrigerant, such as, for example, HCFC-123. The preferred compositions of the present invention tend to exhibit many of the desirable characteristics of HCFC-123 and other HFC refrigerants, including a GWP that is as low, or lower than that of conventional HFC refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

The azeotrope or azeotrope-like compositions of the present invention are particularly useful as refrigerants for chillers, preferably chillers with centrifugal compressors, and even more preferably chillers with centrifugal compressors and flooded type evaporators. An example is as a replacement or retrofit for HCFC-123 in chillers. An azeotrope-like composition of the present invention when used as a retrofit for HCFC-123 in chillers can be prepared by first removing all or part of the HCFC-123 an existing chiller system and then charging said system with either HCFO-1233zd or a combination of HCFO-1233zd and HCFC-123 to produce an azeotrope-like composition of the present invention in the chiller system.

In another embodiment, the azeotrope or azeotrope-like compositions of the present invention may be used as heat transfer fluids. Such heat transfer fluids have uses including, but not limited to, in heat pipes, secondary coolants, in high temperature heat pumps, and heat exchangers.

In another embodiment, the azeotrope or azeotrope-like compositions of the present invention may be used as propellants in sprayable compositions, either alone or in combination with known propellants. The propellant composition comprises, more preferably consists essentially of, and even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope or azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, may be used or adapted for use in accordance with the foam embodiments of the present invention.

Another embodiment of this invention relates to a process for preparing a foamed thermoplastic product is as follows: Prepare a foamable polymer composition by blending together components comprising foamable polymer composition in any order. Typically, a foamable polymer composition is prepared by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin to or near to its glass transition temperature (Tg), or melt temperature (Tm) for crystalline polymers.

Other uses of the present azeotrope-like compositions include use as solvents, cleaning agents, de-fluxing agents, degreasers, flushing agents, and the like. Examples include vapor degreasing, precision cleaning, electronics cleaning, drying cleaning, solvent etching cleaning, carrier solvents for depositing lubricants and release agents, and other solvent or surface treatment. Those of skill in the art will be readily able to adapt the present compositions for use in such applications without undue experimentation.

EXAMPLES

The invention is further illustrated in the following examples which are intended to be illustrative, but not limiting in any manner.

Example 1

Ebulliometric measurements were conducted in an ebulliometer constructed of a glass vessel, submerged in a constant temperature oil bath, equipped with a jacketed condenser maintained at <−20° C. Liquid is added to the glass vessel, the temperature is raised to a temperature above the boiling point. The vapor formed in the glass vessel is re-condensed in the condenser back to the glass vessel. To perform a measurement, a first component of the liquid composition is loaded into the glass vessel. The temperature is raised to above the boiling point of either component. A known amount of the second component is added to the system. The temperature of the liquid is recorded. The system pressure is maintained constant at 1.013 bar. This method permits measurement of the boiling point of the liquid composition in the vessel.

Ebulliometric tests as described were performed on compositions of trans-HCFO-1233zd and HFC-245eb ranging from 0 wt % to 100 wt % trans-HCFO-1233zd as shown in Table 1. The measured boiling points are shown in Table 1 and in FIG. 1.

TABLE 1

| wt % 245eb | wt % trans-1233zd | Boiling Point (° C.) |
| --- | --- | --- |
| 0 | 100 | 19.4 |
| 10 | 90 | 18.7 |
| 22.7 | 77.3 | 18.3 |
| 32.2 | 67.8 | 18.2 |
| 43 | 57 | 18.2 |
| 60 | 40 | 19 |
| 80 | 20 | 20.9 |
| 100 | 0 | 23.8 |

The data in Table 1 and FIG. 1 show the azeotrope like properties of the combination of the present invention.

What is claimed is:

1. An azeotrope composition comprising from about 57 to 77.3 wt % of 1-chloro-3,3,3-trifluoropropene and from about 22.7 to 43 wt % 1,1,1,2,3-pentafluoropropane wherein said azeotrope composition has a boiling point of about 18.2° C. to about 18.3° C. at a pressure of about 1.013 bar.

2. The azeotrope composition of claim 1 further comprising a lubricant.

3. The azeotrope composition of claim 2 wherein said lubricant is selected from the group consisting of mineral oil, alkyl benzenes, polyol esters, polyalkylene glycols, polyvinyl ethers, polyalpha olefins, and combinations of two or more thereof.

4. A heat transfer composition comprising a refrigerant consisting of an azeotrope composition of claim 1.

5. A refrigeration, air conditioning, chilling, or heat pump system comprising a heat transfer composition of claim 4.

6. A method for cooling an article which comprises condensing a heat transfer composition of claim 4 and thereafter evaporating said refrigerant composition in the vicinity of the article to be cooled.

7. A method for heating an article which comprises condensing a heat transfer composition of claim 4 in the vicinity of the article to be heated and thereafter evaporating said refrigerant composition.

8. The heat transfer composition of claim 4 used as a secondary coolant.

9. A sprayable composition consisting of a material to be sprayed and a propellant comprising an azeotrope composition of claim 1.

10. A sprayable composition according to claim 9 wherein the sprayable composition is an aerosol.

11. A foamable pre-mix formulation comprising a blowing agent consisting of the composition of claim 1 and a polyol.

12. A foamable pre-mix formulation of claim 11 further comprising at least one surfactant, catalyst, compatibilizer, flame retardant, UV stabilizer, and mixtures thereof.

13. A solvent consisting of the composition of claim 1.

* * * * *